Feb. 19, 1952     O. N. BRYANT     2,586,511
REHEATER CONTROL FOR TURBINE APPARATUS
Filed Dec. 8, 1948     2 SHEETS—SHEET 1
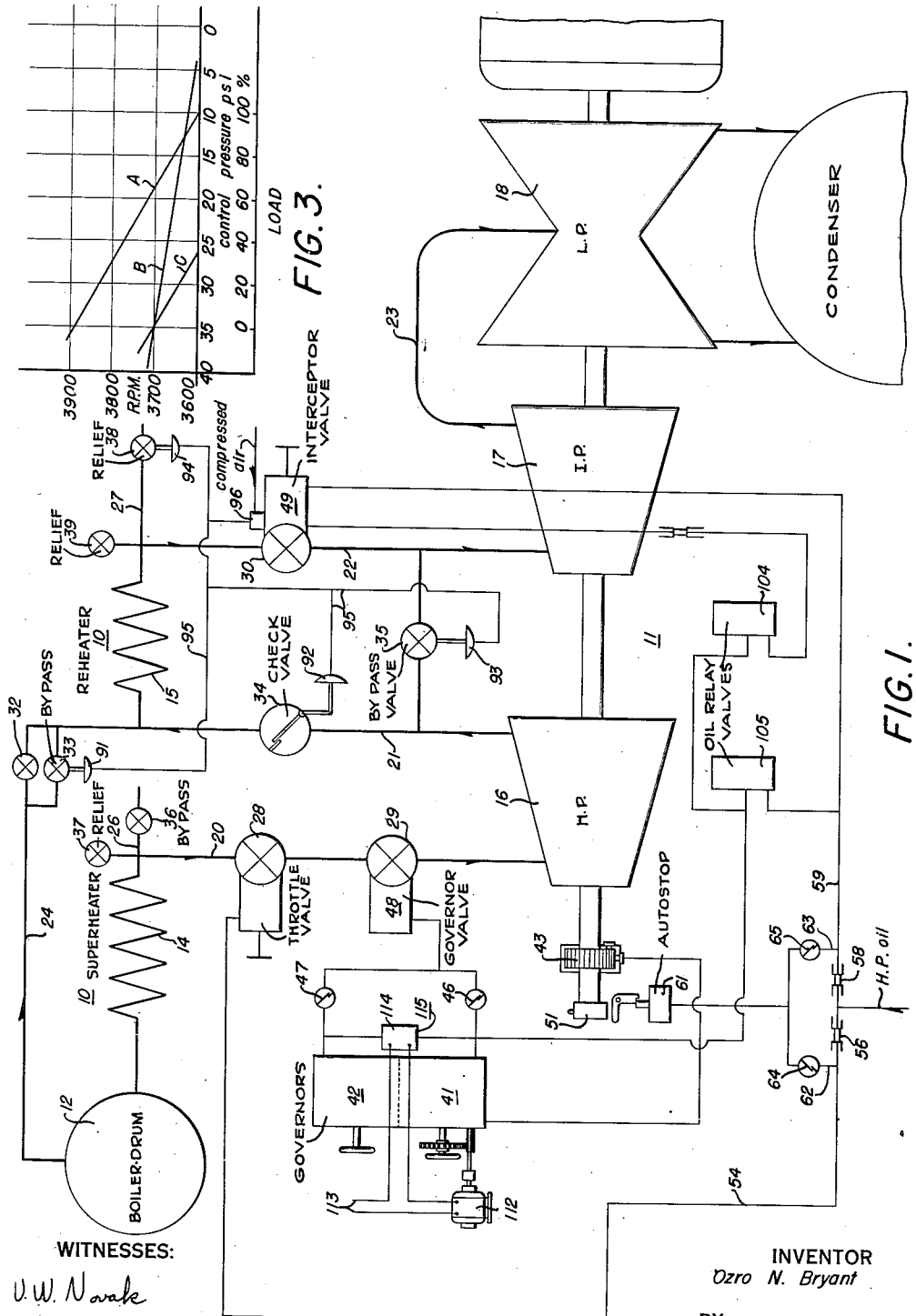
WITNESSES:
U. W. Novak
D. J. McCarty
INVENTOR
Ozro N. Bryant
BY
A. B. Reavis
ATTORNEY

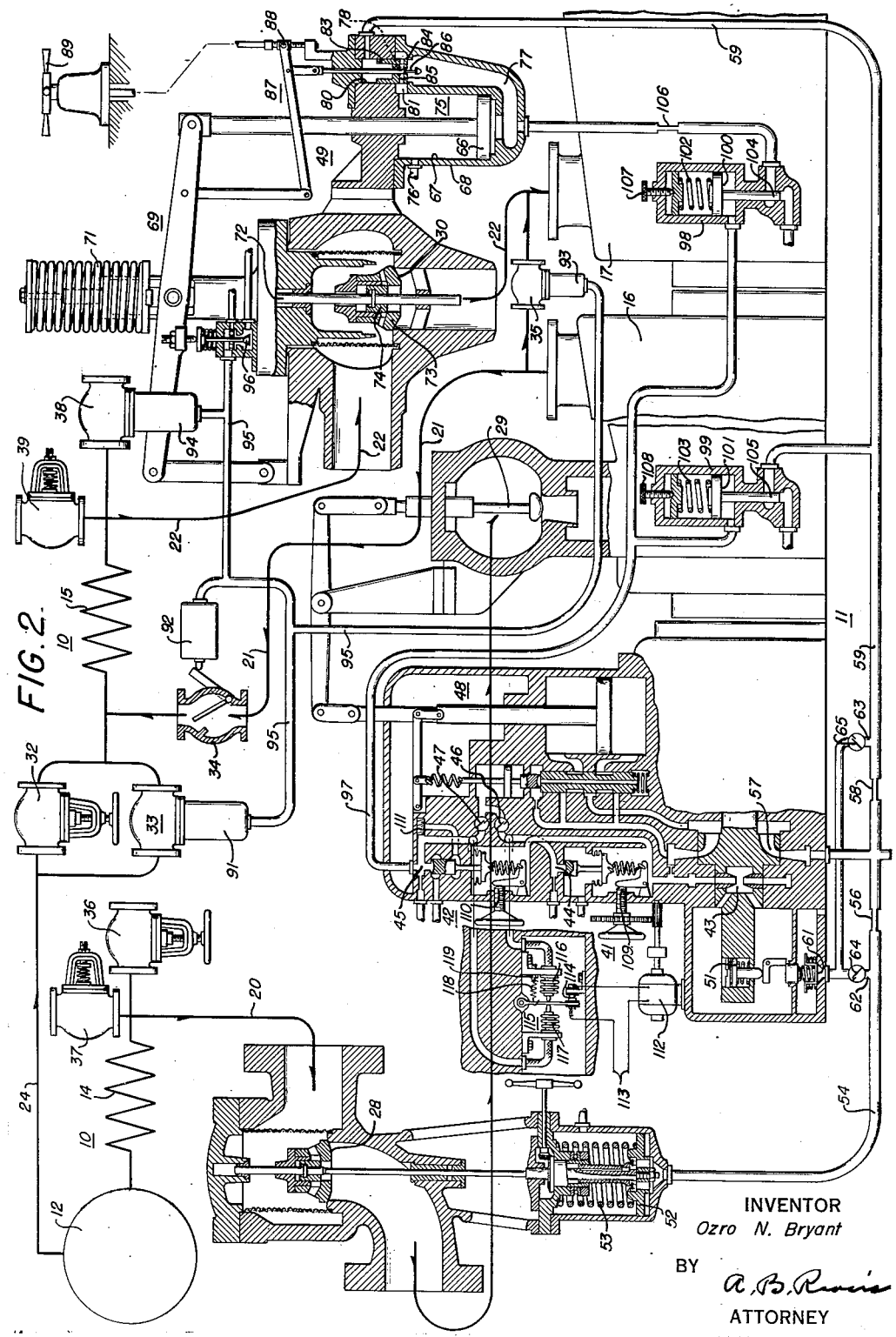

Patented Feb. 19, 1952

2,586,511

UNITED STATES PATENT OFFICE 2,586,511

REHEATER CONTROL FOR TURBINE APPARATUS

Ozro N. Bryant, Prospect Park, Pa., assignor to Westinghouse Electric Corporation, East Pittsburgh, Pa., a corporation of Pennsylvania Application December 8, 1948, Serial No. 64,120

9 Claims. (Cl. 60—73)

This invention relates to the reheat turbine plant disclosed and claimed in my application, Serial No. 52,880, filed October 5, 1948, and it has for an object to provide the interceptor valve thereof with control means operative automatically, pursuant to sudden load drop and increase in speed to close the governor and interceptor valves, then to limit the flow of steam through the interceptor valve so as to avoid overspeeding of the turbine unit to the extent required to trip the interceptor valve to closed position, whereby the residual load may be carried without cycling or hunting involving out-of-phase opening and closing of the governor and interceptor valves and successive increase and decrease in speed, and to provide for automatic resetting of the main governor for the residual load.

A more particular object of the invention is to provide for the interceptor valve servo-motor, first and second valves opened in response to speed of the turbine unit to reduce the pressure applied to the piston of the servo-motor so that the latter operates to move the interceptor valve in a closing direction, with the first valve set to open at a speed higher than normal rated speed to produce valve closing movement in a gradual or controlled manner and with the second valve set to open at a still higher speed for tripping operation of the servo-motor to close rapidly the interceptor valve.

A further more particular object of the invention is to provide means operative, incident to control of the turbine unit being taken over by the auxiliary governor pursuant to sudden load drop automatically to reset the main governor for the residual load.

The foregoing and other objects are effected by my invention as will be apparent from the following description and claims taken in connection with the accompanying drawings, forming a part of this application, in which:

Fig. 1 is a diagrammatic view showing a power plant having the present invention applied thereto;

Fig. 2 is a view showing the plant control system components, partly in section and partly in elevation; and Fig. 3 is a graph explanatory of main and auxiliary governor operation and resetting of the main governor.

In the drawings, there is shown a power plant including a boiler installation, at 10, and a turbine unit, at 11. The boiler installation comprises a drum 12, a superheater 14, and a reheater 15. The turbine unit includes high-pressure, intermediate-pressure, and low-pressure sections 16, 17 and 18.

Steam from the superheater is supplied through the pipe 20 to the inlet of the high-pressure turbine section 16, steam discharging from the latter is furnished to the reheater 15 by a conduit 21, steam flows from the reheater to the intermediate-pressure turbine section through a conduit 22, and steam discharging from the intermediate-pressure section is supplied to the low-pressure section 18 through a cross-over connection 23.

To prevent overheating of the reheater, there is provided a conduit 24 for supplying saturated steam from the drum 12 thereto. Also the superheater and the reheater are provided with atmospheric connections 26 and 27 providing for flow through the superheater and the reheater to avoid overheating thereof.

The conduit 20 for supplying superheated steam to the high-pressure section is provided with a throttle valve 28 and a governing valve 29 and the conduit 22 for supplying reheated steam to the intermediate pressure section has an intercepting valve 30. The connection 24 for supplying saturated steam to the reheater has a manually-operable valve 32 and a pressure-responsive valve 33; the atmospheric connection for the superheater has a manually-operable valve 36 and a pressure relief valve 37; and the atmospheric connection for the reheater has a pressure-responsive valve 38 and a relief valve 39.

Main and auxiliary governors, at 41 and 42, are supplied with oil under primary pressure by means of the impeller 43 carried by the turbine shaft and operative to provide oil under pressure varying substantially as the square of the turbine speed. The main and auxiliary governors furnish oil to the controlling pressure spaces 44 and 45 and the higher of such control pressures, due to the check valves 46 and 47, is the applied control pressure used to control the servo-motor, at 48, for operating the governor valve 29.

The interceptor valve 30 is operated by means of a servo-motor, at 49, in response to oil under pressure to move the intercepting valve in an opening direction; and, when such pressure is reduced, the servo-motor operates to move the intercepting valve in a closing direction. An emergency governor 51 responds to a predetermined overspeed to trip closed the throttle valve 28 and the intercepting valve 30.

As is common in the art, the throttle valve 28 is opened and held open by pressure applied to a piston 52 against a spring 53 by means of oil under pressure in the conduit 54 supplied through an orifice 56 from the impeller 57. The impeller also supplies oil through an orifice 58 to the conduit 59 for supplying the interceptor valve servo-motor, at 49. The emergency governor 51 operates in response to a predetermined overspeed to trip open the normally-closed valve 61 for rapid reduction in pressure of oil in the conduits 54 and 59 to trip closed the throttle and interceptor valves, such conduits having connections 62 and 63 and check valves 64 and 65 arranged to open toward the open valve 61 for such rapid pressure reduction.

The interceptor valve servo-motor, at 49, is preferably of the type disclosed and claimed in Meyer application, Serial No. 60,278, filed November 16, 1948, it including an operating piston 66 in a cylinder 67 provided by the housing 68. Pressure is applied to the operating piston to move the linkage, at 69, against the spring 71 to move the valve rod 72 upwardly to move the interceptor valve 30 in an opening direction. As is common practice with throttle valves, the interceptor valve 30 is comprised by a main plug valve member 73 carrying a valve 74 of smaller diameter and which may be opened and closed by lost motion of the valve rod 72 with the plug valve member 73 seated, the purpose being to balance the pressures at opposite sides of the interceptor valve incident to opening thereof.

The servo-motor cylinder 67 has the space 75 above the piston 66 connected to the drain 76 and the space below the piston forms a part of the pressure space supplied with oil normally through an orifice 78 from the conduit 59. The cylinder housing 68 is formed with a valve cylinder 80 having its upper end connected to the conduit, its lower end opening into the pressure space 77, and opening through a port 81 to the drain space above the operating piston 66. A piston valve 83 in the valve cylinder 80 is provided with said orifice 78 and it normally occupies a position with its lower end fitting the valve seat 84 to interrupt communication between the pressure space 77 and the drain space 75 above the piston.

The piston valve 83 is formed with a port 85 through which oil may escape from the pressure space 77 to the drain space 75 under control of a valve 86 operatively connected, through the follow-up linkage, at 87, to the main operating linkage, at 69. The follow-up linkage has a fulcrum 88 adjustable manually by a handwheel 89.

At one limit of adjustment of the fulcrum, the valve 86 is wide open to provide for escape of oil from the pressure space 77 to prevent building up of pressure therein sufficient to operate the servo-motor for opening of the interceptor valve. With adjustment of the fulcrum to close the valve 86, pressure builds up in the space 77 to move the servo-motor piston 66 upwardly to open the interceptor valve, until, due to the follow-up linkage 87 moving the valve 86 in an opening direction, the outflow of oil from the space 77 has such relation to the inflow of oil through the orifice 78 that the pressure of oil applied to the piston 66 and tending to open the interceptor valve is balanced by the force of the spring 71 tending to close it.

Upward movement of the piston valve 83 in consequence of drop in pressure in the conduit 59 results in the pressure space 77 being placed directly in communication with the drain space 75 through the port 81 in consequence of which the servo-motor, at 49, is operated rapidly to close the interceptor valve.

Pressure-responsive devices 91, 92, 93 and 94 are provided for the saturated steam valve 33, the check valve 34 in the connection 21 between the high-pressure turbine section 16 and the reheater, the reheater by-pass valve 35, and the atmospheric discharge valve 38; and they are connected by piping 95 to the valve 96, the latter being operated during the quarter inch of relative travel of the valve rod 72 with the interceptor valve plug 73 closed.

Initial travel of the valve rod in a direction to open the interceptor valve closes the valve 96 to drop the pressure of air in the piping system 95 to operate the pressure-responsive device 91 to close the saturated steam valve 33, to operate the pressure-responsive device 92 so that the check valve 34 is free to open, and to operate the pressure-responsive devices 93 and 94 to close the reheater by-pass valve 35 and the reheater atmospheric discharge valve 38, respectively.

Continued motion of the valve rod 72 in an intercepting-valve-closing direction after the interceptor valve is closed, the valve 96 is opened to increase the air pressure in the piping system 95 in consequence of which each of the pressure-responsive devices is operated in the contrary direction, the valves 33, 35 and 38 being opened and the pressure-responsive device 92 being operated for positive closing of the check valve 34. While the atmospheric discharge valve 38 for the reheater is shown as being opened and closed automatically in response to closing and opening of the interceptor valve, it will be apparent that, so far as protection is concerned, it is only essential that it open automatically when the interceptor valve closes; it being closed in any suitable manner.

The control pressure space 45 of the auxiliary governor is connected by the conduit 97 to cylinders 98 and 99 to apply pressure to pistons 100 and 101 to move the latter against springs 102 and 103 to move the piston valves 104 and 105 carried thereby in an opening direction.

The valve 105 is arranged to open and connect the conduit 59 directly to the drain, whereupon, the pressure above the piston valve 83 is rapidly reduced and such valve moves upwardly to connect the pressure space 77 to the drain space 75 for rapid operation of the servo-motor, at 49, to close the interceptor valve.

The valve 104 controls escape of oil from the pressure space 77 through an orifice 106 to the drain space; and, as the rate of escape is limited or under control, the resulting servo-motor travel in a direction to close the interceptor valve is gradual or is controlled as compared to that when the valve 105 is tripped open.

The devices responsive to auxiliary governor controlling pressure to open the valves 104 and 105 are provided with adjustments 107 and 108, whereby the valve 104 may be set to open at a speed higher than rated speed and the valve 105 set to open at a still higher speed.

The main and auxiliary governors, at 41, and at 42, have speed changers 109 and 110 and the auxiliary governor is equipped with a speed compensator 111, which is effective to provide, for the auxiliary governor, a percentage of regulation which is relatively much smaller than that of the main governor. By operation of the speed changers, the main governor may be set to carry a given load at rated speed, with the auxiliary governor set so that its full-load speed is higher than the full-load speed of the main governor and its no-load speed is lower than the no-load speed of the main governor.

With a sudden drop in load and consequent acceleration of the turbine unit, the auxiliary governor, at 42, takes over control when its governing control pressure exceeds the governing control pressure of the main governor, at 41, and the interceptor valve servo-motor, at 49, is operated in response to such pressure. Assuming the rated speed to be 3600 R. P. M., then the valve 104 may be set to open at 3700 R. P. M. and the trip valve 105 to open at 3725 R. P. M. With the governing and interceptor valves both closed in response to acceleration due to sudden load drop, when the speed decreases to 3725 R. P. M., the trip valve 105 closes, in consequence of which pressure builds up in the line 59 to move the piston 83 downwardly against the seat 84 to interrupt communication between the spaces 77 and 75; and, when the speed is further reduced to 3700 R. P. M., not only does the governor valve start to open, but the valve 104 closes for building up of pressure below the operating piston 66 to open the interceptor valve. Initial movement of the interceptor valve rod 72 in an opening direction brings about closing of the saturated steam valve 33, release of the check valve 34 and closing of the reheater by-pass valve 35 and the reheater atmospheric discharge valve 38. With steam supplied to the high-pressure turbine section and the interceptor valve open to supply reheated steam to the intermediate-pressure section, the turbine unit carries the residual load with the governor valve and the interceptor valve then operated to keep the speed below the tripping point of the valve 105, whereby hunting or cycling, involving out-of-phase opening and closing of the governor and interceptor valves and consequent successive speed increases and decreases of the unit are avoided.

The speed changer 109 of the main governor is automatically reset for the residual load in response to control of the turbine unit being taken over by the auxiliary governor in the event of sudden load drop. To this end, the main governor speed changer is provided with a motor 112 having a control circuit 113 provided with a switch 114 opened and closed by a differential pressure device, at 115, including oppositely-acting bellows elements 116 and 117 connected, respectively, to the main and auxiliary governor control pressure spaces 44 and 45. Upon the auxiliary governor control pressure exceeding the main governor control pressure and occasioned by sudden drop in load, the differential pressure device closes the switch for operation of the motor to reset the speed changer for the residual load, whereby the main governor is conditioned to take over control and be adjusted to increase the load.

Resetting of the speed changer will be more fully understood from a consideration of the graph in Fig. 3. The main governor has about 8 per cent regulation for full travel of the governor or admission valves as shown on curve A. The auxiliary governor has about 2 per cent regulation, as shown on curve B, and is set to hold no load at 3700 R. P. M. The speed changer of the main governor determines the control pressure when the generator is connected to the system. Curve A shows the relation of pressure to speed or frequency when set for maximum load and curve C shows the relation when set for about 35 per cent of maximum load at the rated speed. In either case, a rise in speed of 100 R. P. M. will increase the control pressure about 9 p. s. i. and will decrease the load about 35 per cent of maximum. However, it will be observed that the control pressure from the auxiliary governor increases four times as rapidly so that, at 3700 R. P. M., the pressure is 35 p. s. i. which will close the valves to the no load point. Since both governors feed oil under controlling pressure to the governor admission valve servo-motor through check valves, it will be evident that whichever is producing the higher pressure will be in control. Assuming that the turbine unit is under control of the auxiliary governor in consequence of sudden load drop, this causes the speed changer motor 112 to turn in the load "Decrease" direction until the governor control pressures are balanced, whereupon the switch opens and the motor stops. Referring again to the curves of Fig. 3, this condition is shown by the intersection of curves B and C at 3700 R. P. M. where both control pressures are 35 p. s. i. Then, as the load comes on the turbine unit, the speed follows curve C instead of curve B, giving normal regulation and consequent better stability.

It is to be understood that the main and auxiliary governors may be used to control the admission of steam to any turbine arrangement, for example, the compound one shown, where, if only a governor corresponding to the main governor were employed, the entrapped steam might suffice, in the event of sudden load drop, to increase the speed sufficiently to operate the emergency governor. Therefore, control by the main governor is supplemented by the auxiliary governor, the latter taking over control of the turbine when there is a sudden load drop and rapidly restricting the admission of steam thereto to avoid overspeeding to the extent required for operation of the emergency governor. In addition, means is provided for automatically resetting the speed changer of the main governor for the reduced load. While, for the accomplishment of the latter result, the drawings show devices which are responsive to the differential of main and auxiliary governor control pressures to reset the main governor speed changer, it will be obvious that any suitable means may be employed to secure this resetting operation pursuant to control of the turbine being taken over by the auxiliary governor in the event of sudden load drop, the apparatus operating to adjust automatically the speed changer of the main governor to reset the latter for control of the turbine at the residual or reduced load. As shown, a spring 118 may be used to adjust the automatic resetting arrangement to a desired extent, the spring preferably being disposed to exert its force in the same direction as the force of the auxiliary governor.

While I have shown my invention in but one form, it will be obvious to those skilled in the art that it is not so limited, but is susceptible of various changes and modifications without departing from the spirit thereof.

What I claim is:

1. In a reheat turbine plant comprising a turbine unit including high and intermediate-pressure sections; a reheater; connections for supplying superheated steam to the high-pressure section, for supplying steam discharging from the high-pressure section to the reheater, and for supplying reheated steam from the reheater to the intermediate-pressure section; a governor valve in the superheated steam supply connection; an interceptor valve in the reheated supply connection; main and auxiliary governors driven by the turbine unit for controlling the governor valve; said auxiliary governor having a smaller percentage of regulation than the main governor and each governor including a speed changer providing for setting of the auxiliary governor so that its full-load speed is higher than the full-load speed of the main governor and its no-load speed is lower than the no-load speed of the main governor; means operated by the auxiliary governor for tripping closed the interceptor valve in response to the auxiliary governor pursuant to a sudden load drop; and means responsive to said auxiliary governor to operate the interceptor valve to maintain the speed of the turbine unit below interceptor valve tripping speed following tripping thereof due to sudden load drop.

2. The combination as claimed in claim 1 with means responsive to operation of the auxiliary governor pursuant to sudden load drop for resetting the main governor for the residual load.

3. In a reheat turbine plant comprising a turbine unit including high and intermediate-pressure sections; a reheater; connections for supplying superheated steam to the high-pressure section; for supplying steam discharging from the high-pressure section to the reheater; and for supplying reheated steam from the reheater to the intermediate-pressure section; main and auxiliary governors driven by the turbine unit and providing liquid control pressures; said auxiliary governor having a smaller percentage of regulation than the main governor and each governor including a speed changer providing for setting of the auxiliary governor so that its full-load speed is higher than the full-load speed of the main governor and its no-load speed is lower than the no-load speed of the main governor; means including check valves so that the higher of said governor control pressures is the applied control pressure; a governor valve in the connection for supplying superheated steam to the high-pressure section and operated in response to said applied control pressure; an interceptor valve in the reheated steam supply connection; said interceptor valve including a main valve member; a servo-motor for operating the interceptor valve; a passage normally supplying liquid under pressure to the servo-motor; said servo-motor including an operating cylinder, an interceptor valve operating piston in the cylinder and dividing the latter into pressure and drain spaces, a valve cylinder communicating with said supply passage and with said spaces, a piston valve in the valve cylinder and effective, when seated, to separate said drain and pressure spaces, and an orifice formed in the piston valve for supplying liquid from the supply passage to said pressure space; an escape valve for said pressure space; a trip valve for said supply passage; means responsive to said applied control pressure for moving the escape and trip valves in opening directions; and means for loading the escape and trip valves so that the escape valve is opened above normal rated speed and the trip valve is opened at a still higher speed.

4. The combination as claimed in claim 3 with means responsive to the differential of said main and auxiliary governor control pressures for resetting the main governor for the residual load after sudden load drop.

5. In a reheat turbine plant comprising a turbine unit including high and intermediate-pressure section; a reheater; connections for supplying superheated steam to the high-pressure section, for supplying steam discharging from the high-pressure section to the reheater, for supplying reheated steam from the reheater to the intermediate-pressure section, for supplying saturated steam to the reheater, for discharging steam from the latter to the atmosphere, and for by-passing the reheater; main and auxiliary governs driven by the turbine unit and providing liquid control pressures; said auxiliary governor having a smaller percentage of regulation than the main governor and each governor including a speed changer providing for setting of the auxiliary governor so that its full-load speed is higher than the full-load speed of the main governor and its no-load speed is lower than the no-load speed of the main governor; means including check valves so that the higher of said governor control pressures is the applied control pressure; a governor valve in the connection for supplying superheated steam to the high-pressure section and operated in response to said applied control pressure; an interceptor valve in the reheated steam supply connection; said interceptor valve including a main valve member and a stem having travel relative to the main valve member when the latter is seated to open and close a supplementary valve, which, when opened, balances pressures at opposite sides of the main valve member to reduce the opening effort required for the latter; a spring for moving the interceptor valve in a closing direction; valves for the saturated steam, reheater atmospheric discharge, and reheater by-pass connections; a check valve in the connection between the high-pressure section and the reheater and opening toward the latter; means for closing the check valve; means responsive to the final portion of travel of the interceptor valve stem in a closing direction to open the saturated steam, the atmospheric discharge, and the reheater by-pass valves and to render said check valve closing means effective to close the check valve and responsive to the initial portion of travel of the valve stem in an opening direction to close the saturated steam, and the reheater by-pass valves and to render the check-valve-closing means ineffective; a servo-motor cooperating with said spring for operating the interceptor valve; a passage normally supplying liquid under pressure to the servo-motor; said servo-motor including an operating cylinder, an interceptor valve operating piston in the cylinder and dividing the latter into pressure and drain spaces, a valve cylinder communicating with said passage and said spaces, a piston valve in the valve cylinder and effective, when seated, to separate said drain and pressure spaces, and an orifice formed in the piston valve for supplying liquid from the passage to said pressure space; an escape valve for said pressure space; a trip valve for said supply passage; means responsive to applied control pressure for moving the escape and trip valves in opening directions; means for loading the escape and trip valves so that the escape valve is opened above normal rated speed and the trip valve is opened at a still higher speed; and means responsive to the differential of said main and auxiliary governor control pressures for resetting the main governor for the residual load after sudden load drop.

6. In a reheat turbine plant comprising a turbine unit including high and intermediate-pressure sections; a reheater; connections for supplying superheated steam to the high-pressure section, for supplying steam discharging from the high-pressure section to the reheater; for supplying reheated steam from the reheater to the intermediate-pressure section; for supplying saturated steam to the reheater, and for discharging steam from the latter to the atmosphere; main and auxiliary governors driven by the turbine unit and providing liquid control pressures; said auxiliary governor having a smaller percentage of regulation than the main governor and each governor including a speed changer providing for setting of the auxiliary governor so that its full-load speed is higher than the full-load speed of the main governor and its no-load speed is lower than the no-load speed of the main governor; means including check valves so that the higher of said governor control pressures is the applied control pressure; a governor valve in the connection for supplying superheated steam to the high-pressure section and operated in response to said applied control pressure; an interceptor valve in the reheated steam supply connection; said interceptor valve including a main valve member and a stem having travel relative to the main valve member, when the latter is seated, to open and close a supplementary valve, which, when opened, balances pressures at opposite sides of the main valve member to reduce the opening effort required for the latter; a spring for moving the interceptor valve in a closing direction; valves for the saturated steam and reheater atmospheric discharge connections; and a check valve in the connection between the high-pressure section and the reheater and opening toward the latter; means for closing the last-named check valve; apparatus for opening and closing the saturated steam and the atmospheric discharge valves and for operating the check-valve-closing means and including means responsive to the final portion of travel of the interceptor valve stem in a closing direction to open the saturated steam and the atmospheric discharge valves and to render the check-valve-closing means effective to close the check valve; a servo-motor cooperating with said spring for operating the interceptor valve; a passage normally supplying liquid under pressure to the servo-motor; said servo-motor including an operating cylinder; an interceptor valve operating piston in the cylinder and dividing the latter into pressure and drain spaces, a valve cylinder communicating with said passage and said spaces, a piston valve in the valve cylinder and effective, when seated, to separate said drain and pressure spaces, and an orifice formed in the piston valve for supplying liquid from the passage to said pressure space; an escape valve for said pressure space; a trip valve for said supply passage; means responsive to applied control pressure for moving the escape and trip valves in opening directions; means for loading the escape and trip valves so that the escape valve is opened above normal rated speed and the trip valve is opened at a still higher speed; and means responsive to the differential of said main and auxiliary governor control pressures for resetting the main governor for the residual load after sudden load drop.

7. In a turbine provided with an emergency governor responsive to a predetermined overspeed for interrupting the supply of motive fluid thereto, a motive fluid admission valve, and apparatus for controlling operation of the admission valve and for moving it rapidly in a closing direction in response to sudden load drop to avoid, on account of entrapped motive fluid, increase in speed sufficient for operation of the emergency governor, said apparatus comprising main and auxiliary governors operated by the turbine for controlling the admission of motive fluid to the latter, said auxiliary governor having its percentage of regulation smaller than that of the main governor and the governors each including a speed changer so that the auxiliary governor may have its full-load speed higher than the full-load speed of the main governor and have its no-load speed lower than the no-load speed of the main governor, and means responsive to operation of the auxiliary governor, incident to taking over control of the turbine pursuant to sudden load drop, to adjust automatically the main governor speed changer to reset the main governor to control the turbine at the reduced load.

8. In a turbine provided with an emergency governor responsive to a predetermined overspeed for interrupting the supply of motive fluid thereto, a motive fluid admission valve, and apparatus for controlling operation of the admission valve and for moving it rapidly in a closing direction in response to sudden load drop to avoid, on account of entrapped motive fluid, increased in speed sufficient for operation of the emergency governor, said apparatus comprising main and auxiliary governors operated by the turbine to provide governing forces each varying as a function of speed, means responsive to the higher of the governing forces to control the admission valve, said auxiliary governor including a speed compensator providing for its percentage of regulation being smaller than the main governor and said governors each including a speed changer so that the auxiliary governor may have its full-load speed higher than the full-load speed of the main governor and have its no-load speed lower than the no-load speed of the main governor, and means responsive to the differential of governing forces of the governors for controlling the main governor speed changer so that, pursuant to sudden load drop, such speed changer may be automatically adjusted to reset the main governor for control of the turbine at the reduced load.

9. In a turbine provided with an emergency governor responsive to a predetermined overspeed for interrupting the supply of motive fluid thereto, a motive fluid admission valve, and apparatus for controlling operation of the admission valve and for moving it rapidly in a closing direction in response to sudden load drop to avoid, on account of entrapped motive fluid, increase in speed sufficient for operation of the emergency governer, said apparatus comprising main and auxiliary governors operated by the turbine to provide control pressures each varying as a function of turbine speed; communications for applying either of said control pressures to said admission valve for effecting operation thereof; a check valve interposed in each of said communications, one or the other of said check valves being responsive to the higher of said control pressures, so that such higher control pressure is applied for operation of said admission valve; said auxiliary governor having its percentage of regulation smaller than that of the main governor and the governors each including a speed changer so that the auxiliary governor may have its full-load speed higher than the full-load speed of the main governor and have its no-load speed lower than the no-load speed of the main governor; and means responsive to the differential of said control pressures of the governors for controlling the main governor speed changer so that, pursuant to sudden load drop, such speed changer may be reset for governing operation at the reduced load.

OZRO N. BRYANT.

No references cited.